United States Patent [19]

Szabo

[11] 3,882,010
[45] May 6, 1975

[54] METHOD OF ELECTROPHORETICALLY FORMING FOUNDRY MOULDS

[75] Inventor: Ervin I. Szabo, Manotick, Canada

[73] Assignee: Canadian Patents and Development Limited, Ottawa, Ontario, Canada

[22] Filed: Aug. 13, 1974

[21] Appl. No.: 497,039

[30] Foreign Application Priority Data

Oct. 26, 1973 Canada .......................... 184329/73

[52] U.S. Cl. .............................................. 204/181
[51] Int. Cl. .............................................. B01k 5/02
[58] Field of Search ..................................... 204/181

[56] References Cited
UNITED STATES PATENTS
2,431,629  11/1947  Wind et al. ..................... 204/181
3,718,564  2/1973   Ebrey ............................. 204/181

Primary Examiner—Howard S. Williams
Attorney, Agent, or Firm—Francis W. Lemon

[57] ABSTRACT

A method of forming foundry moulds wherein a meltable, mould former of, for example, wax is first coated with a mix containing graphite to refractory particles in the range 1:10 to 1;1 by volume to render the surface of the mould former electrically conductive. Further refractory is then applied to the mould former electrophoretically with preferably coarser, stucco coatings applied alternately between the electrophoretic coatings. The conductive coating separates bubble formation, from gas generated during electrophoretic deposition, from the moulding surface of the mould and so avoids imperfections in a casting produced from the mould. Preferably the electrophoretic coating suspension is milled before electrophoretic deposition therefrom to expose fresh particle surfaces and increase the electrophoretic mobility of the particles.

7 Claims, No Drawings

METHOD OF ELECTROPHORETICALLY FORMING FOUNDRY MOULDS

This invention relates to a method of electrophoretically forming foundry moulds.

In the metal founding industry there are a number of critical operations which contribute to the success or failure of a given casting. Each of these play their role in ensuring that the final product meets the combined demands of soundness, dimensional accuracy and surface finish. Improvements and/or modifications of any of the operations will have a bearing on the quality of the finished product.

In the investment casting foundry particular stress is placed on all three of the criteria listed above, and painstaking care is exercised in the production of the pattern, forming of the mould and the melting and pouring of the metal.

It is an object of the present invention to provide a method of forming foundry moulds by electrophoretically depositing refractory particles from a suspension.

Basically the electrophoretic deposition of refractory particles from liquid on to a deposition electrode consists of inducing migration of the particles from the liquid by the application of a suitable electrical potential. It has been proposed to use either an alternating or a direct electrical potential, although an alternating electrical potential is of limited utility. The chief disadvantages using an alternating electrical potential are that the particles migrate under the influence of a non-uniform electrical field, and that the direction of migration is dependent on the relative dielectric strengths of the liquid and the particles.

Electrophoresis using a direct electrical potential is more readily controlled than that using an alternating electrical potential, and the migration of the particles is accomplished through the establishment of an electrically charged layer on each particle.

A problem that arises with electrophoretically forming foundry moulds is that the refractory particles frequently have to be deposited on to a mould former of an electrically non-conductive material such as wax or plastic which is meltable to release the mould former from the foundry mould formed thereon, and this necessitates providing an electrically conductive coating on the mould former prior to the deposition thereon of refractory particles by electrophoresis.

One method of providing the mould former with an electrically conductive coating is by vapour deposition of metal and, while this may be satisfactory in some instances, there is a danger that ions present in the suspension from which the refractory is electrophoretically being deposited may cause gases to evolve and form gas bubbles at positions on the surface of the electrically conductive coating and suppress electrophoretic deposition at these positions. The gas bubbles remain as cavities or holes in the electrophoretically deposited refractory coating on the mould former, and after the mould former has been melted from the coating, and the electrically conductive coating been burned away, the resulting foundry mould has cavities or holes at the gas bubble positions which during metal casting in the mould become filled with casting metal and form defects in the casting.

It is an object of the present invention to provide a method of electrophoretically forming a foundry mould wherein the tendency for the formation of defects in a casting produced from the foundry mould, by gas bubbles forming on the mould during electrophoretic deposition thereon of refractory material, is substantially reduced.

It is not to be construed that by the present invention the formation of the gas bubbles is suppressed because the present invention, as will be described later, overcomes the problem by removing such gas bubbles, as may form, away from the moulding surface of the mould former and so away from the mould surface of the foundry mould thus produced.

According to the present invention there is provided a method of electrophoretically forming a foundry mould, comprising:

a. coating a meltable mould former, which is electrically non-conductive, with graphite and refractory particles and a binder to form an electrically conductive coating thereon containing graphite to refractory particles in the range 1:10 to 1:1 by volume, b. applying additional refractory particles electrophoretically to said electrically conductive coating, c. applying further refractory particles to said electrically conductive coating to form a foundry mould, and d. heating said mould former to melt it and then removing the molten mould former material from the foundry mould.

Preferably the mould former is dipped into a suspension containing the graphite and refractory particles and the binder to receive the electrically conductive coating.

The further refractory particles may be applied as relatively coarser stucco coatings between electrophoretically applied refractory coatings.

Preferably the electrically conductive coating contains graphite to refractory particles in the range 1:3 to 1:2 by volume.

In experiments to verify the present invention, wax mould formers were coated with the electrically conductive coating suspensions listed in the Table I and then electrophoretically coated using the suspensions listed in the Table II.

TABLE I

| EXAMPLE | ELECTRICALLY CONDUCTIVE COATING SUSPENSION | | | |
| --- | --- | --- | --- | --- |
| | (i) | (ii) | (iii) | (iv) |
| Iso-propanol | 900ml | 950ml | — | 250ml |
| Water | — | 50ml | — | — |
| Colloidal silica, (obtainable from Nalco Chemical Co., Chicago Illinois, U.S.A.) | — | — | 900ml (1050DMK) | 750ml (.1034a) |
| Cellulose | 5g ethyl cellulose | 5g methyl cellulose | — | — |
| Rubber Solvent (obtainable from Shell Canada Ltd.) | 100ml | — | — | — |

TABLE I – Continued

| EXAMPLE | ELECTRICALLY CONDUCTIVE COATING SUSPENSION | | | |
|---|---|---|---|---|
| | (i) | (ii) | (iii) | (iv) |
| Fused silica flour (obtainable from Nalco Chemical Co., Chicago Illinois, U.S.A.) | — | — | 750g(P.-W.) | — |
| Fine ground alumina (obtainable from Aluminum Co. of Canada Ltd., Montreal, Quebec, Canada) | — | — | — | 1000g C71 |
| Graphite (obtainable from Union Carbide Canada, Ltd. Toronto, Ontario, Canada) | 100g (B-200) | 10'g B-100 | 250g B-200 | 250g No. 38 |
| Acetylene black (obtainable from Gulf Oil Canada Ltd., Montreal, Quebec, Canada) | — | — | — | 10g |
| Comments | The cellulose was dispersed in the isopropanol prior to adding the rubber solvent. | The cellulose was dispersed in the isopropanol prior to adding the water. | The conductive pre-coat was milled for 2–4 hrs before use. | Milling of the conductive pre-coat was avoided. |

TABLE II

| EXAMPLE | ELECTROPHORETIC COATING SUSPENSION | | |
|---|---|---|---|
| | (a) | (b) | (c) |
| Colloidal Silica (obtainable from Nalco Chemical Co., Chicago Illinois, U.S.A.) | 500ml 1060 | 500ml 1034a | 1000ml 1034a |
| Water | 550ml | 500ml | — |
| Fused silica flour (as in Table I) | — | 2000g | — |
| Fine ground alumina (obtainable from Aluminum Co., of Canada Ltd. Montreal, Quebec, Canada) | 2500g C-71 | — | 2500g C-71 |
| Comments | The alumina was added in portions to the colloidal silica and water mixture with milling between additions. | The silica flour was found to be easier to incorporate into the colloidal silica and water mixture than example(a) | With the alumina mixed only in the colloidal silica it was not possible to add the alumina all at once and obtain a good dispersion and so the alumina was added to the colloidal silica in small portions to aid dispersion therein. |

EXPERIMENT I

A wax mould former was dipped in the electrically conductive coating suspension (i), Table I and the electrically conductive coating thus applied was allowed to dry. An attempt was then made to electrophoretically apply a coating using the electrophoretic coating suspension (b), Table II. Limited electrophoretic deposition only was achieved and this was close to an electrically conductive holder used to suspend the mould former in the electrophoretic coating suspension and apply the electrical potential.

Increasing the electrical potential for the electrophoretic deposition resulted in heating the electrically conductive coating to such an extent that the wax of the mould former, adjacent the electrically conductive coating, was melted due to the higher electrical current.

EXPERIMENT II

A wax mould former was given an electrically conductive coating, from electrically conductive coating suspension (i), Table I, in the same manner as the wax mould former of Example I. The electrophoretic coating suspension (b), Table II, was milled for twelve hours and then used to electrophoretically coat the wax mould former, with stucco coatings deposited alternately with the electrophotically deposited coatings. The electrophetic deposition was carried out using 1 to 10 volts/cm.

The wax mould former thus coated was dried and the wax melted out to leave a hollow foundry mould. Inspection of the interior of the hollow foundry mould showed that blisters were present which could be attributed to gas bubble formation during electrophoretic deposition.

EXPERIMENT III

A wax mould former was given an electrically conductive coating, from electrically conductive coating suspension (ii), Table I and the coating thus applied was allowed to dry. An attempt was then made to electrophoretically apply a coating using the electrophoretic coating suspension (b), Table II. Limited electrophoretic deposition only was achieved in the same manner as Experiment I, that is, deposition was close to an electrically conductive holder used to suspend the mould former in the electrophoretic coating suspension and apply the electrical potential.

Also, as with Experiment I, it was found that increasing the electrical potential for the electrophoretic deposition resulted in heating the electrically conductive coating to such an extent that the wax of the mould former, adjacent the electrically conductive coating, was melted due to the higher current.

EXPERIMENT IV

A wax mould former was dipped in the electrically conductive coating suspension (ii), Table I and electrically conductive coating thus applied was allowed to dry. The electrophoretic coating suspension (b), Table II, was milled for twelve hours and then used to electrophoretically coat the wax mould former, with stucco coatings deposited alternately with the electrophoretically deposited coatings. The electrophoretic deposition was carried out using 1 to 10 volts/cm.

The wax mould former thus coated was dried and the wax melted out to leave a hollow foundry mould. Inspection of the interior of the mould showed that blisters were present as with Experiment II, which could be attributed to gas bubble formation during electrophoretic deposition.

EXPERIMENT V

A wax mould former was dipped in the electrically conductive coating suspension (iii), FIG. I, and the electrically conductive coating thus applied was allowed to dry. An attempt was then made to electrophoretically apply a coating using the electrophoretic coating suspension (a), Table II. Once again the electrophoretic deposition was limited to an area adjacent an electrically conductive holder used to suspend the mould former in the electrophoretic coating suspension and apply the electrical potential.

It was also again found that increasing the electrical potential for the electrophoretic deposition resulted in heating the electrically conductive coating to such an extent that the wax of the mould former, adjacent the electrically conductive coating, was melted due to the higher electrical current.

It was noted that by thoroughly mixing the electrophoretic suspension (a), Table II, and not milling it, before electrophoretic deposition, it was slightly more viscous initially than when this electrophoretic suspension was thoroughly mixed and ball milled.

EXPERIMENT VI

A similar experiment to the Experiment V described above was carried out, using the same electrically conductive coating and the same electrophoretic coating suspension, except that stucco coatings were deposited alternately with such electrophoretically deposited coatings. The results were the same as those from Experiment V.

In all of the above experiments the stucco coatings were applied by means of a fluidized bed, the coatings were a relatively coarser coating than that applied electrophoretically.

EXPERIMENT VII

A wax mould former was dipped in the electrically conductive coating suspension (iv), Table I, and stuccoed with fused silica sand and allowed to dry. When dry the wax mould former was electrophoretically coated with the electrophoretic coating suspension (c), Table II. The electrophoretic coating suspension was thoroughly mixed only, that is, it was not milled.

Once again the electrophoretic deposition was limited to an area adjacent an electrically conductive holder used to suspend the mould former in the electrophoretic coating suspension and apply the electrical potential.

As with Experiment I, increasing the electrical potential was found to melt the wax adjacent the electrically conductive coating.

EXPERIMENT VIII

A similar experiment to Experiment VII was carried out, using the same electrically conductive coating and the same electrophoretic coating suspension, except that the electrophoretic coating suspension was thoroughly mixed and milled to expose fresh, uncontaminated surfaces on the refractory particles, and stucco coatings were applied alternately with the electrophoretically deposited coatings.

The electrophoretic deposition was carried out using an electrical potential of between 1 to 10 volts/cm and the deposition was found to be uniformly distributed over the wax mould former. After thorough drying the wax was melted out and the shell was examined and no defects were noted which would be attributable to gas evolution during electrophoretic deposition.

EXPERIMENT IX

A similar experiment to Experiment VIII was carried out, using the same electrically conductive coating and the same electrophoretic coating suspension. The only difference was that graphite was thoroughly mixed in the stucco mixture in the range 1:10 to 1:1 parts by volume of graphite to refractory particles to render the stucco electrically conductive. The graphite particle size range was approximately the same as that of the refractory. This was found to further enhance the electrical conductivity of the coating on the wax mould former thereby assuring a move uniform distribution of electrical potential on its surface, as a result further improvements in the electrophoretic deposition was achieved.

Examination of foundry moulds produced by Experiments VIII and IX showed that any gas bubbles that formed during electrophoretic deposition were not on the moulding surface but were on the side of the electrically conductive coating on which electrophoretic deposition had occurred.

The experiments showed that milling the electrophetic coating suspensions exposed fresh uncontaminated surfaces of the particles which rendered them electrophoretically mobile in the suspension. Fresh uncontaminated surfaces of the particles could also be exposed for this purpose by vacuum heat treatment.

Best results were obtained when the electrophoretic coating suspension contained graphite to refractory particles in the range 1:3 to 1:2 by volume.

I claim:

1. A method of electrophoretically forming a foundry mould, comprising:
    a. coating a meltable mould former, which is electrically non-conductive, with graphite and refractory particles and a binder to form an electrically conductive coating thereon containing graphite to refractory particles in the range 1:10 to 1:1 by volume,
    b. applying additional refractory particles electrophoretically to said electrically conductive coating, c. applying further refractory particles to said electrically conductive coating to form a foundry mould, and
d. heating said mould former to melt it and then removing the molten mould former material from the foundry mould.

2. A method according to claim 1, wherein said mould former is dipped into a suspension containing said graphite and refractory particles and said binder to receive said electrically conductive coating.

3. A method according to claim 1, wherein said further refractory particles are applied as relatively coarser stucco coatings between electrophoretically applied refractory coatings.

4. A method according to claim 1, wherein said electrically conductive coating contains graphite to refractory particles in the range 1:3 to 1:2 by volume.

5. A method according to claim 1, wherein an electrophoretic coating suspension, from which the further refractory particles are applied, is thoroughly mixed and treated to expose fresh, uncontaminated surfaces on the refractory particles and render them electrophoretically mobile, before the additional refractory particles are applied electrophoretically therefrom to the mould former.

6. A method according to claim 5, wherein the refrarctory particles of the electrophoretic coating suspension are milled to the expose fresh, uncontaminated surfaces.

7. A method according to claim 3, wherein said stucco coating contains graphite, and said graphite is present in the range 1:10 to 1:1 by volume of the refractory particles.

* * * * *